(12) United States Patent
Shi et al.

(10) Patent No.: US 11,463,697 B2
(45) Date of Patent: Oct. 4, 2022

(54) METHOD AND APPARATUS FOR CODING VIDEO, ELECTRONIC DEVICE AND COMPUTER-READABLE STORAGE MEDIUM

(71) Applicant: Beijing Baidu Netcom Science and Technology Co., Ltd., Beijing (CN)

(72) Inventors: Le Shi, Beijing (CN); Wenpeng Ding, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 17/239,181

(22) Filed: Apr. 23, 2021

(65) Prior Publication Data

US 2021/0258580 A1    Aug. 19, 2021

(30) Foreign Application Priority Data

Aug. 4, 2020    (CN) .......................... 202010773759.9

(51) Int. Cl.
*H04N 19/124* (2014.01)
*H04N 19/184* (2014.01)
*H04N 19/463* (2014.01)

(52) U.S. Cl.
CPC ......... *H04N 19/124* (2014.11); *H04N 19/184* (2014.11); *H04N 19/463* (2014.11)

(58) Field of Classification Search
CPC .. H04N 19/124; H04N 19/184; H04N 19/463; H04N 19/146; H04N 19/159;

(Continued)

(56) References Cited

U.S. PATENT DOCUMENTS

| | | | |
|---|---|---|---|
| 2002/0090029 A1* | 7/2002 | Kim | H04N 19/177 375/240.03 |
| 2003/0185299 A1 | 10/2003 | Takita | |
| 2005/0069211 A1 | 3/2005 | Lee et al. | |
| 2007/0025441 A1 | 2/2007 | Ugur et al. | |

(Continued)

FOREIGN PATENT DOCUMENTS

| | | |
|---|---|---|
| CN | 1604654 A | 4/2005 |
| CN | 104618734 A | 5/2015 |

(Continued)

OTHER PUBLICATIONS

European Patent Office, Extended European Search Report for Application No. 21170231.1, dated Oct. 21, 2021 (9 pages).

(Continued)

*Primary Examiner* — Joseph Suh
(74) *Attorney, Agent, or Firm* — Nixon Peabody LLP

(57) ABSTRACT

A method and apparatus for coding a video, an electronic device and a computer-readable storage medium. A specific implementation scheme is: coding a sampled video frame sequence of a source video by using a preset coding mode to obtain a sample coding overhead; analyzing frame types of frames to be coded in the source video to obtain a frame type sequence of the frames to be coded; determining a predictive coding overhead of the source video according to the sample coding overhead of the source video, the frame type sequence of the frames to be coded, and quantization parameters of coding modes to be used corresponding to different frame types; and determining a coding strategy based on the predictive coding overhead and requirements of transmission bit rate limit information.

18 Claims, 6 Drawing Sheets

(58) Field of Classification Search
CPC .... H04N 19/172; H04N 19/132; H04N 19/50; H04N 19/157
See application file for complete search history.

(56) References Cited

U.S. PATENT DOCUMENTS

| | | | | |
|---|---|---|---|---|
| 2012/0213275 | A1* | 8/2012 | Kwon | H04N 19/132 375/240.12 |
| 2014/0010278 | A1* | 1/2014 | Lou | H04N 19/80 375/240.02 |
| 2015/0281693 | A1* | 10/2015 | Okawa | H04N 19/176 375/240.03 |
| 2016/0366416 | A1* | 12/2016 | Liu | H04N 19/463 |
| 2017/0163986 | A1* | 6/2017 | Jacobson | H04N 19/593 |
| 2017/0359601 | A1* | 12/2017 | Sievers | H04N 21/234363 |
| 2018/0332281 | A1 | 11/2018 | Yu et al. | |
| 2018/0343469 | A1* | 11/2018 | Jin | H04N 19/59 |
| 2019/0013028 | A1* | 1/2019 | Atti | G10L 19/24 |
| 2019/0335204 | A1* | 10/2019 | Lei | H04N 19/103 |
| 2020/0162739 | A1* | 5/2020 | Cheong | H04N 19/146 |
| 2020/0177888 | A1* | 6/2020 | Saeedi | H04N 19/107 |
| 2020/0382781 | A1 | 12/2020 | Mao et al. | |
| 2020/0382792 | A1 | 12/2020 | Gao et al. | |
| 2021/0176467 | A1* | 6/2021 | Saeedi | H04N 19/194 |

FOREIGN PATENT DOCUMENTS

| | | |
|---|---|---|
| CN | 104954792 A | 9/2015 |
| CN | 108391127 A | 8/2018 |
| KR | 20160139233 A | 12/2016 |
| WO | 2019242486 A1 | 12/2019 |

OTHER PUBLICATIONS

Choi, H. et al.; "Rate control based on unified RQ model for HEVC"; 8th JCT-VC Meeting; Feb. 1-10, 2021; San Jose, California (Joint Collaborative Team on Video Coding of ISO/IEC JTCI/SC29/WG11 and ITU-T SG.16), No. JCTVC-H0213; Feb. 3, 2012; XP030232327; retrieved from the Internet: http://phenix.int-evry.fr/jct/doc_enduser/documents/8_San%20Jose/wg11/JCTVC-H0213-v2.zip JCTVC-H0213_42.doc (14 pages).

Si, J. et al.; "Adaptive rate control for HEVC"; $10^{th}$ JCT-VC Meeting101 MPEG Meeting; Jul. 11-20, 2012; Stockholm; (Joint Collaborative Team on Video Coding of ISO/IEC JTC1/S29/WG11 and ITU-T SG.16); retrieved from the Internet: http://wftp3.itu.int/av-arch/jctvc-site/; No. JCTVC-J0057, Jul. 13, 2012; XP030112419 (9 pages).

* cited by examiner

METHOD AND APPARATUS FOR CODING VIDEO, ELECTRONIC DEVICE AND COMPUTER-READABLE STORAGE MEDIUM

CROSS-REFERENCE TO RELATED APPLICATIONS

This application claims priority to Chinese Patent Application No. 202010773759.9, filed with the China National Intellectual Property Administration (CNIPA) on Aug. 4, 2020, the contents of which are incorporated herein by reference in their entirety.

TECHNICAL FIELD

The present disclosure relates to the field of cloud computing technology, particularly to the fields of video processing technology, video coding technology and communication transmission technology, and more particularly to a method and apparatus for coding a video, an electronic device and a computer-readable storage medium.

BACKGROUND

A video is a continuous sequence of images, and is composed of continuous frames, wherein one frame is one image. Due to the persistence effect of human eyes, when a sequence of frames is played at a certain rate, what we see is a video with continuous motions.

There are similarities among the continuous frames, and thus in order to facilitate storage and transmission, the original video needs to be coded and compressed to remove redundancy in spatial and temporal dimensions in the prior art.

SUMMARY

Embodiments of the present disclosure provide a method and apparatus for coding a video, an electronic device and a computer-readable medium.

In a first aspect, embodiments of the present disclosure provide a method for coding a video, comprising: coding a sampled video frame sequence of a source video by using a preset coding mode to obtain a sample coding overhead; analyzing frame types of frames to be coded in the source video to obtain a frame type sequence of the frames to be coded; determining a predictive coding overhead of the source video according to the sample coding overhead of the source video, the frame type sequence of the frames to be coded, and quantization parameters of coding modes to be used corresponding to different frame types; and determining a coding strategy based on the predictive coding overhead and requirements of transmission bit rate limit information.

In a second aspect, embodiments of the present disclosure provide an apparatus for coding a video, comprising: a pre-coding unit, configured to code a sampled video frame sequence of a source video by using a preset coding mode to obtain a sample coding overhead; a frame type analysis unit, configured to analyze frame types of frames to be coded in the source video to obtain a frame type sequence of the frames to be coded; a coding overhead prediction unit, configured to determine a predictive coding overhead of the source video according to the sample coding overhead of the source video, the frame type sequence of the frames to be coded, and quantization parameters of coding modes to be used corresponding to different frame types; and a strategy determination unit, configured to determine a coding strategy based on the predictive coding overhead and requirements of transmission bit rate limit information.

In a third aspect, embodiments of the present disclosure provide an electronic device, comprising: one or more processors; and a memory, storing one or more programs, wherein the one or more programs, when executed by the one or more processors, cause the one or more processors to implement the method for coding a video provided by the first aspect.

In a forth aspect, embodiments of the present disclosure provide a computer-readable medium, storing a computer program thereon, wherein the program, when executed by a processor, causes the processor to implement the method for coding a video provided by the first aspect.

According to the present disclosure, a sampled video frame sequence of a source video is coded by using a pre-coding mode to obtain a sample coding overhead, a coding overhead is subsequently predicted for frame types of different frames to be coded in the source video and quantization parameters corresponding to coding modes to be used, and the predicted coding overhead is compared with transmission bit rate limit information to determine a coding strategy, so that bit rate allocation is performed in a more reasonable manner to improve the quality of video coding.

It should be understood that the content described in this section is neither intended to identify key or important features of the embodiments of the present disclosure, nor intended to limit the scope of the present disclosure. Other features of the present disclosure will become understandable through the following description.

BRIEF DESCRIPTION OF THE DRAWINGS

The accompanying drawings are used to better understand the solution and do not constitute limitations to the present disclosure. In the figures.

DETAILED DESCRIPTION OF EMBODIMENTS

Exemplary embodiments of the present disclosure will be described below in combination with the accompanying drawings, which comprise various details of the embodiments of the present disclosure to facilitate understanding and should be regarded as merely exemplary. Therefore, it should be appreciated by those of ordinary skill in the art that various changes and modifications may be made to the embodiments described here without departing from the scope and spirit of the present disclosure. Likewise, for clarity and conciseness, descriptions of well-known functions and structures are omitted in the following description.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
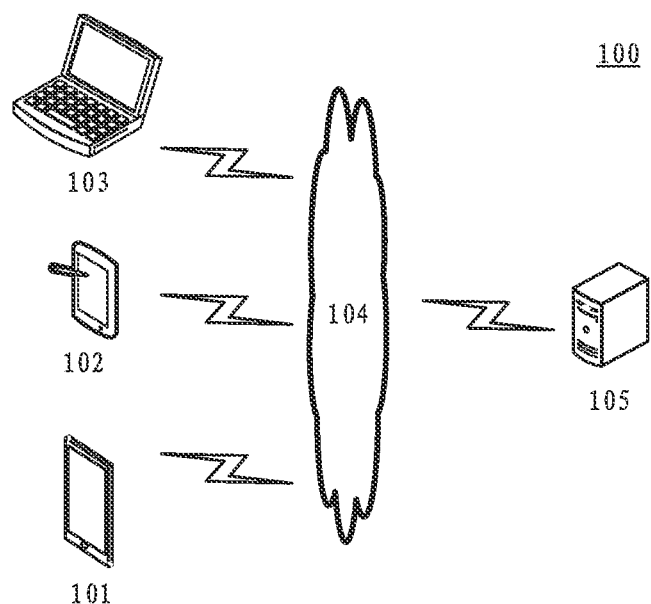
FIG. 1 is an exemplary system architecture to which the present disclosure may be applied.

FIG. 1 shows an exemplary system architecture 100 to which a method and apparatus for coding a video, an electronic device and a computer-readable medium according to the embodiments of the present disclosure may be applied.

As shown in FIG. 1, the system architecture 100 may comprise a terminal device 101, 102, and 103, a network 104, and a server 105. The network 104 serves as a medium providing a communication link between the terminal device 101, 102, or 103 and the server 105. The network 104 may comprise various types of connections, such as wired or wireless communication links, or optical fiber cables.

A user may use the terminal device 101, 102 or 103 to interact with the server 105 through the network 104 to receive a video playback request or send videos. The terminal device 101, 102 or 103 may be installed with various applications for video interaction, such as online video-on-demand applications, video upload applications, social applications, etc.

The terminal device 101, 102 or 103 may be hardware or software. When the terminal device 101, 102, or 103 is hardware, the terminal device may be various electronic devices with a display screen, including but not limited to a smart phone, a tablet computer, a laptop computer and a desktop computer. When the terminal device 101, 102, or 103 is software, the terminal device may be installed in the above-listed electronic devices. The terminal device may be implemented as a plurality of software programs or software modules (for example, used to implement video coding services), or as a single software program or software module. Specific limitations are not given here.

The server 105 may be a server that provides various services, for example, acquires, through the network 104, a video playback request from the terminal device 101, 102, or 103 that receives a coded source video in the present disclosure, and codes a sampled video frame sequence of the source video by using a preset coding mode to obtain a sample coding overhead; analyzes frame types of frames to be coded in the source video to obtain a frame type sequence of the frames to be coded; determines a predictive coding overhead of the source video according to the sample coding overhead of the source video, the frame type sequence of the frames to be coded, and quantization parameters of coding modes to be used corresponding to different frame types; and determines a coding strategy based on the predictive coding overhead and the requirements of transmission bit rate limit information.

It should be noted that the method for coding a video according to the embodiments of the present disclosure may be executed by the server 105, and accordingly, the apparatus for coding a video may be configured in the server 105.

The server 105 may be a server that provides various services, for example, a back-end server that provides support for information displayed on the terminal device 101, 102, or 103. The back-end server may analyze the received data such as images and vehicle position information, and feed processing results (such as position information of a target element) back to the terminal device.

It should be noted that the server may be hardware or software. When the server is hardware, the server may be implemented as a distributed server cluster composed of a plurality of servers, or as a single server. When the server 105 is software, the server may be implemented as a plurality of software programs or software modules (for example, used to provide distributed services), or as a single software program or software module. Specific limitations are not given here.

It should be understood that the numbers of the terminal devices, networks, and servers in FIG. 1 are merely illustrative. Any number of terminal devices, networks and servers may be configured according to actual requirements.

It should be pointed out that the terminal device 101, 102 or 103 may also be installed with applications for coding a video, and the terminal device 101, 102 or 103 may also complete video coding. Code a sampled video frame sequence of a source video by using a preset coding mode to obtain a sample coding overhead; analyze frame types of frames to be coded in the source video to obtain a frame type sequence of the frames to be coded; determine a predictive coding overhead of the source video according to the sample coding overhead of the source video, the frame type sequence of the frames to be coded, and quantization parameters of coding modes to be used corresponding to different frame types; and determine a coding strategy based on the predictive coding overhead and requirements of transmission bit rate limit information. At this time, the method for coding a video may be executed by the terminal device 101, 102 or 103. Accordingly, the apparatus for coding a video may be arranged in the terminal device 101, 102 or 103. At this time, the exemplary system architecture 100 may not comprise the server 105 and the network 104.

It should be understood that numbers of terminal devices, networks, and servers in FIG. 1 are merely illustrative. There may be any numbers of terminal devices, networks and servers according to implementation needs.

Figure 2:
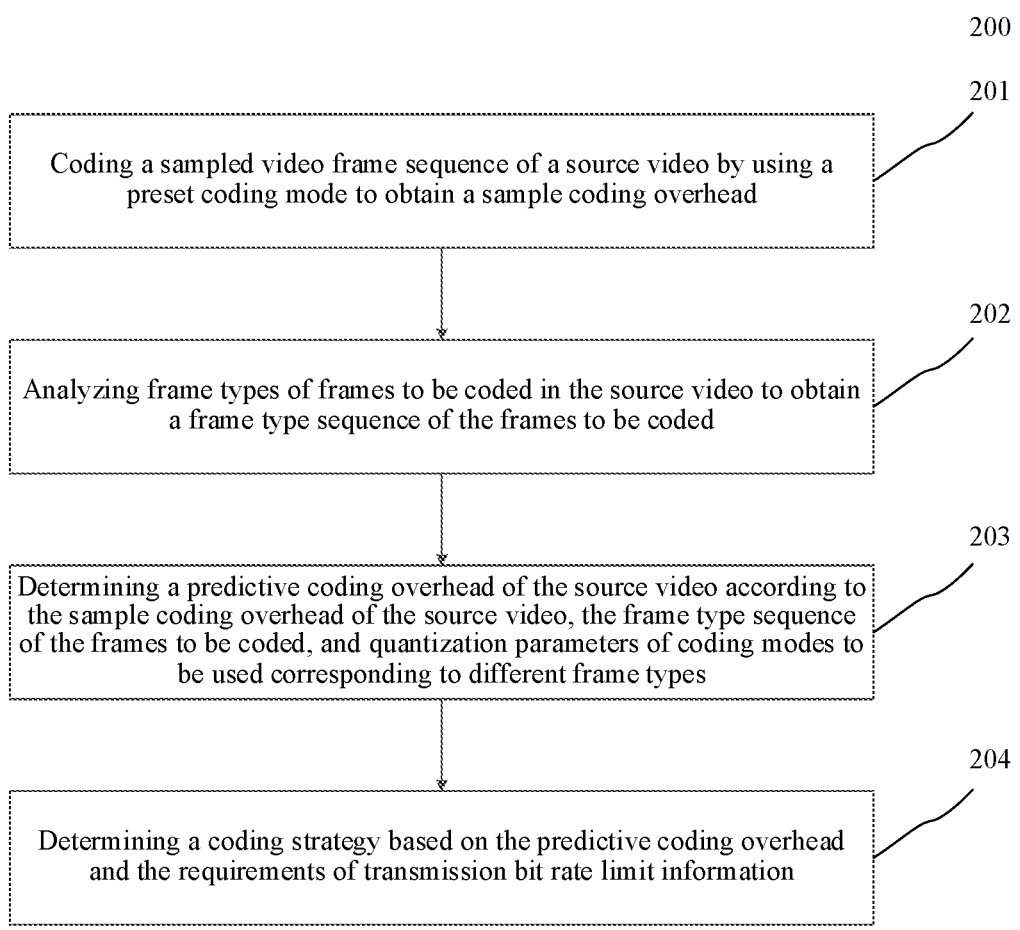
FIG. 2 is a flowchart of an embodiment of a method for coding a video according to the present disclosure.

Continuing to refer to FIG. 2, a flow 200 of an embodiment of a method for coding a video according to the present disclosure is shown. The method for coding a video comprises the following steps:

Step 201: coding a sampled video frame sequence of a source video by using a preset coding mode to obtain a sample coding overhead.

In this embodiment, the execution subject (for example, the server 105 or the terminal device 101, 102, or 103 shown in FIG. 1) of the method for coding a video may acquire the source video from a local or non-local storage device (for example, the terminal device 101, 102, or 103 shown in FIG. 1).

The local storage device may be a data storage module configured in the execution subject, and in this case, the source video may be acquired only by reading locally. The non-local storage device may also be other data storage server special for storing the source video, and in this case, the execution subject may send a source video acquisition command to the data storage server to acquire the source video returned by the data storage server.

Specifically, the acquired source video is coded by using a preset coding mode. The preset coding mode is a common mode for coding a video, such as a Motion Picture Experts Group (MPEG) coding mode, an Audio Video Interleaved (AVI) coding mode and a Flash Video (FLV) coding mode. After the source video is pre-coded by using the preset coding mode, quantization parameters corresponding to the preset coding mode, and information such as the number of bits consumed for intra-frame coding, the number of bits consumed for inter-frame coding, and the ratio of intra-frame blocks in inter-frame coding in the coding results, are used as the sample coding overhead.

On this basis, after the part to be coded in the source video is determined, the source video may be sampled to obtain the video frame sequence of the source video, and the video frame sequence may be coded.

Step 202: analyzing frame types of frames to be coded in the source video to obtain a frame type sequence of the frames to be coded.

Specifically, analyzing the frame types of the frames to be coded in the source video is generally to divide the frame types of the frames to be coded according to different information required for the frames to be coded, for example, the analysis results are divided into intra-frame coded frames, forward predictive coded frames and bidirectional differential coded frames, according to whether data of other frames needs to be referred during coding.

The intra-frame coded frame is an independent frame with all its own information, may be decoded independently without referring to other images, and may be simply interpreted as a still image. The forward coded frame is a frame that may be coded by referring to the previous intra-frame coded frames or forward coded frames. The forward coded frame represents the difference between the current frame of image and the previous frame (the previous frame may be an intra-frame coded frame or a forward coded frame). When the forward coded frame is decoded, the previously cached image is superimposed with the difference defined by this frame to generate a final image. The bidirectional differential coded frame records the difference between the current frame and the previous and subsequent frames, that is, a corresponding decoded bidirectional differential coded frame, in which not only the previously cached image but also the decoded image need to be acquired, and the previous and subsequent images are superimposed with the current frame of data to obtain a final image.

It should be understood that, after the sampled video frame sequence in the source video is coded by using the preset coding mode, the frame type sequence of the frames to be coded may be obtained according to the types of the frames to be coded in the coded sampled video frame sequence.

Step 203: determining a predictive coding overhead of the source video according to the sample coding overhead of the source video, the frame type sequence of the frames to be coded, and quantization parameters of coding modes to be used corresponding to different frame types.

Specifically, according to the types of the frame sequence obtained in step 202, when the execution subject codes the sampled video frame sequence in the source video by using the preset coding mode, the sample coding overhead corresponding to the types of frames to be coded may be obtained, and then the coding overhead required when coding the types of frames to be coded by using the coding modes to be used may be predicted according to the different types of the frames to be coded and the coding modes selected corresponding to the types.

Exemplarily, when the analysis results of the frames to be coded are intra-frame coded frames, since the type of the intra-frame coded frames only refers to the sample coding overhead of the current frame of the frames to be coded, then after the quantization parameter corresponding to the preset coding mode in the sample code is obtained, a conversion proportion relationship is determined according to the quantization parameter corresponding to the preset coding mode and the quantization parameter corresponding to the coding mode to be used, and the predictive coding overhead corresponding to the coding mode to be used is predicted according to the conversion proportion relationship and the coding overhead corresponding to the coding mode according to the coding overhead consumed by the coding mode.

Step 204: determining a coding strategy based on the predictive coding overhead and the requirements of transmission bit rate limit information.

Specifically, after the predictive coding overhead corresponding to the coding mode to be used is obtained, it is determined whether the predictive bit rate overhead meets the requirements of the transmission bit rate limit information; if the predictive bit rate overhead meets the requirements, the source video may be coded by using the coding mode to be used; and if the predictive bit rate overhead does not meet the requirements, other coding mode to be used is used or the quantization parameters in the coding mode to be used are adjusted, so that the predictive bit rate overhead meets the requirements of the bit rate limit information.

In the method for coding a video according to the embodiment of the present disclosure, a sampled video frame sequence of a source video is coded by using a preset coding mode to obtain a sample coding overhead; frame types of frames to be coded in the source video are analyzed to obtain a frame type sequence of the frames to be coded; a predictive coding overhead of the source video is determined according to the sample coding overhead of the source video, the frame type sequence of the frames to be coded, and quantization parameters of coding modes to be used corresponding to different frame types; and a coding strategy is determined based on the predictive coding overhead and the requirements of transmission bit rate limit information. The method for coding a video according to the present disclosure may determine the coding strategy based on the predictive coding overhead and the requirements of the transmission bit rate limit information, so that bit rate allocation is performed in a more reasonable manner to improve the quality of video coding.

Figure 3:
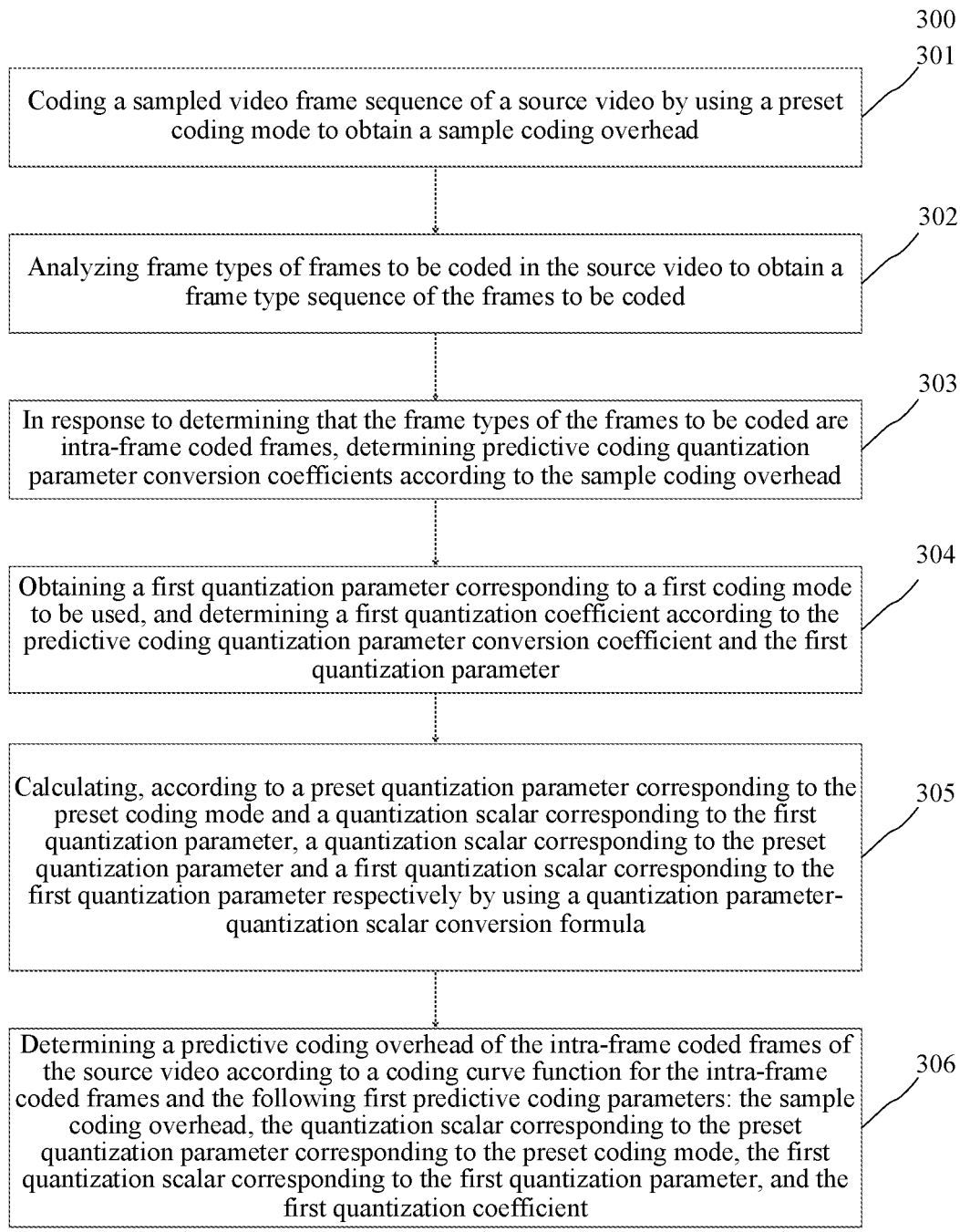
FIG. 3 is a flowchart of another embodiment of a method for coding a video according to the present disclosure.

Continuing to refer to FIG. 3, a flow 300 of another embodiment of a method for coding a video according to the present disclosure is shown. The flow of predictive coding overhead of frames to be coded whose types are intra-frame coded frames is shown, including the following steps:

Step 301: coding a sampled video frame sequence of a source video by using a preset coding mode to obtain a sample coding overhead.

Step 302: analyzing frame types of frames to be coded in the source video to obtain a frame type sequence of the frames to be coded.

Step 303: in response to determining the frame types of the frames to be coded being intra-frame coded frames, determining predictive coding quantization parameter conversion coefficients according to the sample coding overhead.

Specifically, after the frame types of the frames to be coded are determined to be intra-frame coded frames, the number of bits consumed by intra-frame coding in the sample coding overhead of the frames to be coded is substituted into linear relationships of the quantization parameter conversion coefficients determined based on historical data statistics:

$$f1 = a_0 * \text{bits} I^2 + a_1 * \text{bits} I + a_2.$$

$$f2 = b_0 * \text{bits} I^2 + b_1 * \text{bits} I + b_2.$$

$$f3 = c_0 * \text{bits} I^2 + c_1 * \text{bits} I + c_2.$$

Where, f1, f2, f3 are predictive coding quantization parameter conversion coefficients, bitsI is the number of bits consumed in intra-frame coding, and $a_0$, $a_1$, $a_2$, $b_0$, $b_1$, $b_2$, $c_0$, $c_1$, and $c_2$ are constant variables in the linear relationships of the current quantization parameter conversion coefficients determined based on historical data. The linear relationships of the quantization parameter conversion coefficients are used to determine the first, second, and third predictive coding quantization parameter conversion coefficients.

Step 304: obtaining a first quantization parameter corresponding to a first coding mode to be used, and determining a first quantization coefficient according to the predictive coding quantization parameter conversion coefficient and the first quantization parameter.

Specifically, a first quantization parameter-coefficient linear relationship determined based on historical data is used:

$$f5 = f1*qp^2 + f2*qp + f3$$

Where, f5 is the first quantization coefficient, f1, f2, and f3 are the first, second, and third predictive coding quantization parameter conversion coefficients obtained in step 303, and qp is the first quantization parameter corresponding to the first coding mode. The first quantization parameter-coefficient linear relationship is used to determine the first quantization coefficient.

Step 305: calculating, according to a preset quantization parameter corresponding to the preset coding mode and a quantization scalar corresponding to the first quantization parameter, a quantization scalar corresponding to the preset quantization parameter and a first quantization scalar corresponding to the first quantization parameter respectively by using a quantization parameter-quantization scalar conversion formula.

Specifically, after the frame types of the frames to be coded are determined to be intra-frame coded frames, the first quantization parameter corresponding to the quantization parameter of the coding mode to be used is obtained, and according to the quantization parameter-quantization scalar conversion formula:

$$qp = 12.0 + 6.0*\log_2(qscale/0.85)$$

Where qp is the quantization parameter, and qscale is the quantization scale. The quantization parameter-quantization scalar conversion formula is used to respectively determine the preset quantization parameter and the first quantization parameter, the corresponding preset quantization scalar and the first quantization scalar.

Step 306: determining a predictive coding overhead of the intra-frame coded frames of the source video according to a coding curve function for the intra-frame coded frames and the following first predictive coding parameters: the sample coding overhead, the quantization scalar corresponding to the preset quantization parameter corresponding to the preset coding mode, the first quantization scalar corresponding to the first quantization parameter, and the first quantization coefficient; wherein the coding curve function for the intra-frame coded frames is obtained by fitting historical data of actual coding parameters.

Specifically, the coding curve function for the intra-frame coded frames is obtained by fitting historical data of actual coding parameters:

$$estBitsI = f5*bitsI*qscale/estQ$$

Where, estBitsI is the predictive coding overhead of the intra-frame coded frames of the source video, f5 is the first quantization coefficient determined in step 304 above, bitsI is the coding overhead of the intra-frame coded frames in the sample coding overhead, qscale is the preset quantization scalar obtained in step 305 above, and estQ is the first quantization scalar obtained in the above step. The coding curve function for the intra-frame coded frames is used to determine the predictive coding overhead of the intra-frame coded frames of the source video.

In this embodiment, a flow for determining a to-be-coded predictive coding overhead of an intra-frame coded frame type is provided on the basis of the embodiment shown in FIG. 2, and the same parts as those of the embodiment shown in FIG. 2 are not repeated. Through this flow, the predictive coding overhead of the intra-frame coded frame type of frames to be coded may be accurately determined, which provides data support for subsequent comparison based on the predictive coding overhead and transmission bit rate limit information, and improves the accuracy of selection of video coding quantization parameters.

In some optional implementation modes of this embodiment, the determining the first quantization coefficient according to the predictive coding quantization parameter conversion coefficient and the first quantization parameter comprises: confining the obtained first quantization coefficient by a predetermined threshold condition.

Specifically, an appropriate threshold condition may be selected according to information such as usage requirements and characteristics of the source video. After the first quantization coefficient is determined, whether the first quantization coefficient is within the threshold condition is judged, for example:

$$f5 = \begin{cases} f5 = th1, f5 < th1 \\ f5 = f5, th1 < f5 < th2, \\ f5 = th2, th2 < f5, \end{cases}$$

Where, f5 is the first quantization coefficient determined in the above step, and th1 and th2 are respectively predetermined threshold conditions. The corresponding relationship may confine the first quantization coefficient by setting the threshold condition to ensure that the quantization information is within a preset range, so as to ensure that the data obtained when the first quantization coefficient is used for subsequent operations meets condition requirements.

In some optional implementation modes of this embodiment, the determining a coding strategy based on the predictive coding overhead and the requirements of transmission bit rate limit information comprises:

in response to the predictive coding overhead of the intra-frame coded frames of the source video meeting the requirements of the transmission bit rate limit information, coding the intra-frame coded frames in the frames to be coded by using the first quantization parameter.

Specifically, after the transmission bit rate limit information is acquired, the acquired transmission bit rate limit information is compared with the determined predictive coding overhead, usually by comparing a bit value corresponding to the predictive coding overhead with a bit value allowed to pass in the transmission bit rate limit information. If the bit value corresponding to the predictive coding overhead is smaller than or equal to the bit value allowed to pass, it is considered to meet the requirements of the transmission bit rate limit information, and the intra-frame coded frames in the frames to be coded may be coded by using the first quantization parameter corresponding to the predictive coding overhead, to ensure that the source video may be coded by using the first quantization parameter, thereby ensuring the reliability of the coding process.

In some optional implementation modes of this embodiment, the determining a coding strategy based on the predictive coding overhead and the requirements of transmission bit rate limit information comprises: in response to the predictive coding overhead of the intra-frame coded frames of the source video not meeting the requirements of the transmission bit rate limit information, re-determining the first quantization parameter according to the predictive coding overhead of the intra-frame coded frames of the source video and the transmission bit rate limit information.

Specifically, after the transmission bit rate limit information is acquired, the acquired transmission bit rate limit information is compared with the determined predictive coding overhead, usually by comparing a bit value corresponding to the predictive coding overhead with a bit value allowed to pass in the transmission bit rate limit information. If the bit value corresponding to the predictive coding overhead is greater than the bit value allowed to pass, it is considered to not meet the requirements of the transmission bit rate limit information, the intra-frame coded frames in the frames to be coded may not be coded by using the first quantization parameter corresponding to the predictive coding overhead, but a new first quantization parameter needs to be determined to ensure that the source video may be coded by using the first quantization parameter, thereby ensuring the reliability of the coding process.

Figure 4:
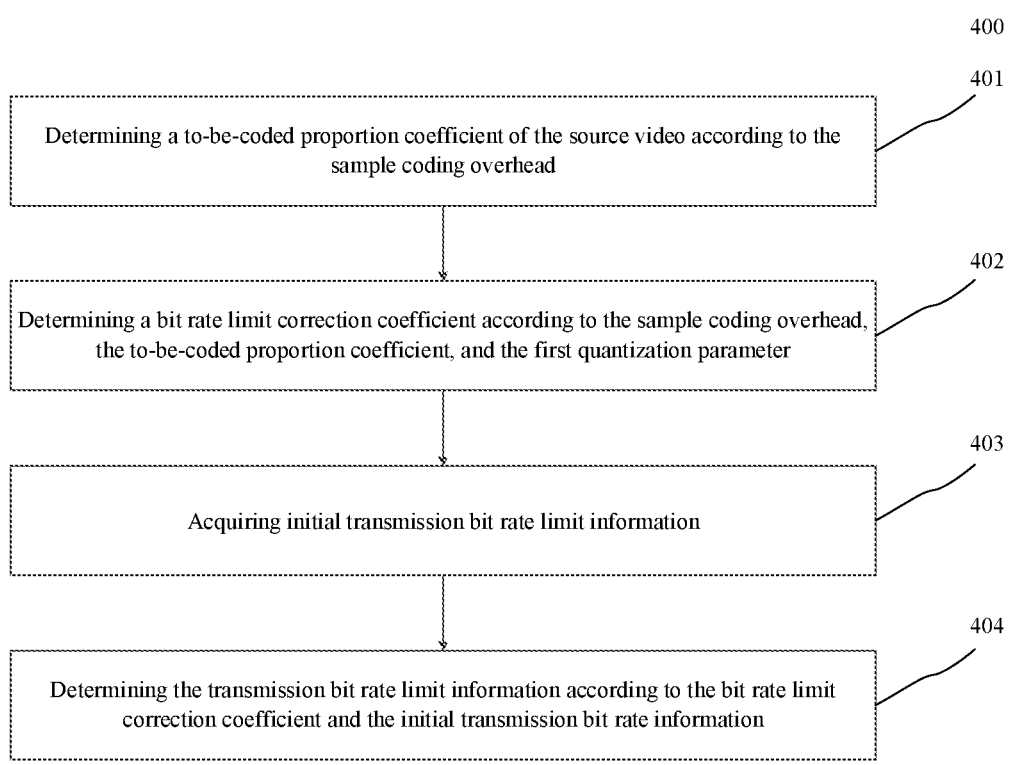
FIG. 4 is a flowchart of a method for determining transmission bit rate limit information in the method for coding a video according to the present disclosure.

In some optional implementation modes of this embodiment, the transmission bit rate limit information is determined based on the following steps:

Specifically, as shown in FIG. 4, in a flow 400, step 401 is: determining a to-be-coded proportion coefficient of the source video according to the sample coding overhead.

Specifically, in the obtained sample coding overhead of the source video, the number of bits consumed for intra-frame coding of the current frame and the number of bits consumed for inter-frame coding of subsequent frames are substituted into the linear relationship of the to-be-coded proportion coefficient determined based on historical data:

$$f4 = d_0 * \frac{bitsI}{bitsPB} + d_1$$

Where, f4 is the to-be-coded proportion coefficient, bitsI is the number of bits consumed for intra-frame coding of the current frame, bitsPB is the number of bits consumed for inter-frame coding of subsequent frames, and $d_0$ and $d_1$ are constants of the to-be-coded proportion coefficient determined based on historical data. The linear relationship of the to-be-coded proportion coefficient is used to determine the to-be-coded proportion coefficient.

Step 402: determining a bit rate limit correction coefficient according to the sample coding overhead, the to-be-coded proportion coefficient, and the first quantization parameter.

Specifically, according to the to-be-coded proportion coefficient obtained in the above step and the preset quantization parameter corresponding to the pre-coding mode, a coding-limit proportion coefficient conversion relationship determined based on historical data is used:

$$f6 = \begin{cases} e_0 * f4, qp < t1 \\ (1-e_0) * f4 * \frac{qp-t1}{t2-t1} + t1, t1 < qp < t2, \\ e_1 * f4 * \left(\frac{t3-qp}{t3-t2} + 1\right), t2 < qp < t3, \\ e_1 * f4, t3 < qp, \end{cases}$$

Where, qp is the preset quantization parameter corresponding to the pre-coding mode, f4 is the to-be-coded proportion coefficient, t1, t2, and t3 are boundary values of a quantization parameter threshold range corresponding to the conversion relationship between coding proportion coefficients and limit proportion coefficients determined based on historical data, and $e_0$ and $e_1$ are constants of the conversion relationship between coding proportion coefficients and limit proportion coefficients determined based on historical data. The coding-limit proportion coefficient conversion relationship is used to determine the bit rate correction coefficient.

Step 403: acquiring initial transmission bit rate limit information.

Step 404: determining the transmission bit rate limit information according to the bit rate limit correction coefficient and the initial transmission bit rate limit information.

The bit rate correction coefficient determined in step 402 above is multiplied by the bit value allowed to pass in the initial transmission bit rate limit information acquired in step 403 to determine a corrected bit value allowed to pass, and the corrected bit value allowed to pass is used as the transmission bit rate limit information.

The transmission bit rate limit information is corrected in the above steps of the flow 400, so that the transmission bit rate limit information is adjusted for uncoded video frames, the transmission bit rate limit information is more accurate, the influence of coded frames on the transmission bit rate limit information is reduced, and the transmission efficiency is improved by increasing the utilization of a transmission channel.

Figure 5:
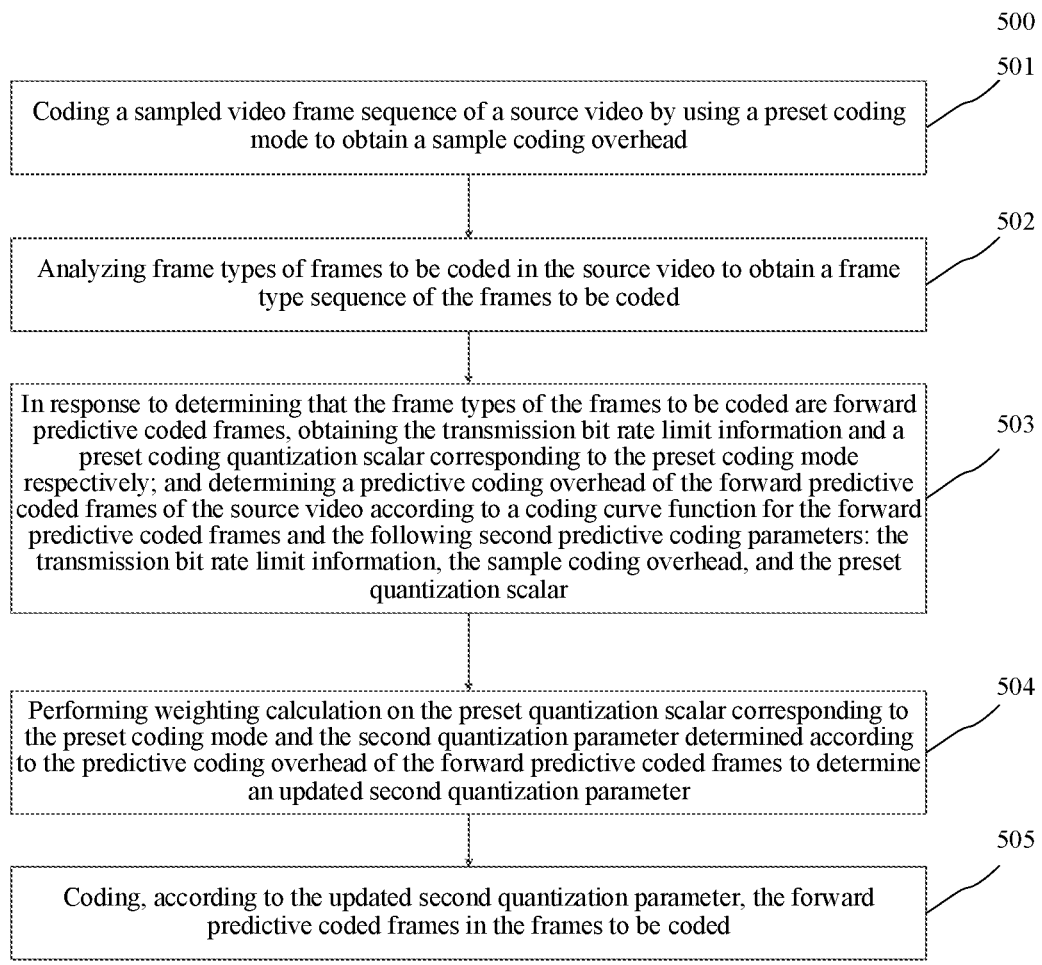
FIG. 5 is a flowchart of another embodiment of a method for coding a video according to the present disclosure.

Continuing to refer to FIG. 5, a flow 500 of another embodiment of a method for coding a video according to the present disclosure is shown. The flow of predictive coding overhead of frames to be coded whose types are forward predictive coded frames is shown, including the following steps:

Step 501: coding a sampled video frame sequence of a source video by using a preset coding mode to obtain a sample coding overhead.

Step 502: analyzing frame types of frames to be coded in the source video to obtain a frame type sequence of the frames to be coded.

Step 503: in response to determining that the frame types of the frames to be coded are forward predictive coded frames, obtaining the transmission bit rate limit information and the preset coding quantization scalar corresponding to the preset coding mode respectively; and determining a predictive coding overhead of the forward predictive coded frames of the source video according to a coding curve function for the forward predictive coded frames and the following second predictive coding parameters: the transmission bit rate limit information, the sample coding overhead, and the preset quantization scalar, wherein the coding curve function for the forward predictive coded frames is obtained by fitting historical data of actual coding parameters.

Specifically, the coding curve function of the predictive coded frames is usually: an original coding-pre-coding conversion coefficient is equal to an average value calculated after accumulation of products of the number of bits consumed by respective coded frames in the sample coding overhead and the quantization scalar corresponding to the used coding mode, divided by an average value of the number of bits consumed to code respective frames coded by the preset coding mode in the sample coding overhead. According to this function relationship, the original coding-pre-coding conversion coefficient is obtained.

A bit value allowed to pass in the transmission bit rate limit information is obtained, and the product of the number of bits consumed for pre-coding in the sample coding overhead and the original coding-pre-coding conversion coefficient is divided by the bit value allowed to pass to determine a second predictive coding overhead corresponding to a coding mode to be used.

Step 504: performing weighting calculation on the preset quantization scalar corresponding to the preset coding mode and the second quantization parameter determined according to the predictive coding overhead of the forward predictive coded frames to determine an updated second quantization parameter; wherein, the characteristic proportion parameter is determined according to a characteristic parameter curve function and the sample coding overhead.

Specifically, the corresponding second quantization parameter may be determined according to the second predictive coding overhead obtained in step 503; afterwards, a weighting proportion coefficient is determined according to the following characteristic parameter curve $$\text{weight} = f8 * \frac{bitsI}{bitsPB} + f9 * intraRatio + f10$$

Where, weight represents the weighting proportion coefficient, bitsI is the number of bits consumed for intra-frame coding, bitsPB is the number of bits consumed for inter-frame pre-coding, intraRatio is the ratio of intra-frame blocks, and f8, f9, and f10 are characteristic constants determined based on historical data; finally, the second quantization parameter determined in the above step is updated according to the determined weighting proportion coefficient.

Step 505: coding, according to the updated second quantization parameter, the forward predictive coded frames in the frames to be coded.

In this embodiment, a flow for determining a to-be-coded predictive coding overhead of a forward predictive coded frame type is provided on the basis of the embodiment shown in FIG. 2, and the same parts as those of the embodiment shown in FIG. 2 are not repeated. Through this flow, the predictive coding overhead of the forward predictive coded frame type of frames to be coded may be accurately determined, which provides data support for subsequently determining the second quantization parameter according to the predictive coding overhead and the transmission bit rate limit information; and the second quantization parameter is adjusted according to the data to improve the accuracy of selection of video coding quantization parameters.

In some optional implementation modes of this embodiment, the coding, based on the second quantization parameter, the forward predictive coded frames in the frames to be coded comprises: determining a coded proportion coefficient according to the number of coded frames and the number of frames to be coded in the sampled video sequence, and determining whether the coded proportion coefficient satisfies a preset threshold condition; in response to determining that the coded proportion coefficient does not satisfy the preset threshold condition, adjusting the second quantization parameter according to the first quantization parameter; and coding the forward predictive coded frames in the frames to be coded by using the adjusted second quantization parameter.

Specifically, when the coded proportion coefficient determined according to the number of coded frames and the number of frames to be coded in the source video is obtained according to the sampled video sequence, and when it is determined that the coded proportion coefficient does not satisfy the preset threshold condition, the second quantization parameter is adjusted by using the first quantization parameter determined in the above step, and the forward predictive coded frames in the frames to be coded are coded using the frames coded by means of the second quantization parameter, to prevent the problem of cold start caused by the absence of an available quantization parameter to code the video when the coded frames used for reference do not satisfy the threshold condition.

In some optional implementation modes of this embodiment, the coding, based on the second quantization parameter, the forward predictive coded frames in the frames to be coded comprises: in response to determining that the coded proportion coefficient satisfies the preset threshold condition, coding the forward predictive coded frames in the frames to be coded by using the second quantization parameter.

Specifically, when the coded proportion coefficient determined according to the number of coded frames and the number of frames to be coded in the source video is obtained according to the sampled video sequence, and when it is determined that the coded proportion coefficient satisfies the preset threshold condition, the forward predictive coded frames are coded by using the second quantization parameter determined in the above step, and the video is coded by using the more accurate quantization parameter when the coded frames used for reference satisfy the threshold condition, thereby improving the effect of video coding.

In some optional implementation modes of this embodiment, in response to determining that the frame types of the frames to be coded are bidirectional differential coded frames, a third quantization parameter is determined according to a quantization parameter for adjacent frames, wherein the quantization parameter for the adjacent frames comprises: the first quantization parameter corresponding to the intra-frame coded frames and/or the second quantization parameter corresponding to the forward predictive coded frames; and the bidirectional differential coded frames in the frames to be coded are coded by using the third quantization parameter.

Specifically, when it is determined that the frame types of the frames to be coded are bidirectional differential coded frames, the third quantization parameter is determined according to the quantization parameter for the adjacent frames. For example, if the adjacent frames are intra-frame coded frames, the first quantization parameter corresponding to the predictive coding overhead of the intra-frame coded frames of the source video is determined as the third quantization parameter according to the coding curve function for the intra-frame coded frames and the following first predictive coding parameters: the sample coding overhead, the preset quantization scalar corresponding to the preset quantization parameter, the first quantization scalar corresponding to the first quantization parameter, and the first quantization coefficient, and the bidirectional differential coded frames in the frames to be coded are coded by using the third quantization parameter. Similarly, based on the characteristics of the bidirectional differential coded frames, when the adjacent frames are an intra-frame coded frame and a forward predictive coded frame (the previous frame is an intra-frame coded frame and the latter frame is a forward predictive coded frame, or the previous frame is a forward predictive coded frame and the latter frame is an intra-frame coded frame), the first quantization parameter used for the intra-frame coded frame may be used as the third quantization parameter, or the second quantization parameter corresponding to the forward predictive coded frame may also be used as the third quantization parameter. In this way, when the type of a frame to be coded is a bidirectional differential coded frame, coding may be performed directly with reference to the quantization parameter for the adjacent frames to improve the coding efficiency.

To deepen understanding, the present disclosure further provides a specific implementation scheme in combination with a specific application scenario. In the present disclosure scenario, after the execution subject of the method for coding a video acquires a source video, samples in the source video are coded by using a preset coding mode, and a preset quantization parameter and a preset quantization coefficient corresponding to the preset coding mode, and information such as the number of bits consumed for intra-frame coding, the number of bits consumed for inter-frame coding, and the ratio of intra-frame blocks in inter-frame coding in the coding results, are determined as a sample coding overhead.

Frame types of frames to be coded in the source video are analyzed to obtain a frame type sequence of the frames to be coded. The frame type sequence comprises intra-frame coded frames, forward coded frames and bidirectional differential coded frames. A first quantization parameter used for coding the intra-frame coded frames is first determined.

After the frame types of the frames to be coded are determined to be intra-frame coded frames, linear relationships of quantization parameter conversion coefficients are determined based on historical data statistics, where $a_0$, $a_1$, $a_2$, $b_0$, $b_1$, $b_2$, $c_0$, $c_1$, and $c_2$ are respectively 1, 2, 200, 2, 1, 30, 3, 5, and 600. 500 bits, as the number of bits consumed for intra-frame coding in the sample coding overhead of the frames to be coded, is substituted into the linear relationships of the quantization parameter conversion coefficients determined based on historical data statistics:

$$f1=1*500^2+2*500+200$$

$$f2=2*500^2+2*500+30$$

$$f3=3*500^2+5*500+600$$

The first, second, and third predictive coding quantization parameter conversion coefficients are determined to be 251200, 501030, and 753100, respectively.

A first quantization parameter-coefficient linear relationship determined based on historical data is used:

$$f5=f1*qp^2+f2*qp+f3$$

qb is the first quantization parameter 1 corresponding to the first coding mode, and the first quantization coefficient is determined to be 1505330.

After the frame types of the frames to be coded are determined to be intra-frame coded frames, the first quantization parameter corresponding to the quantization parameter of a coding mode to be used is obtained, and according to a quantization parameter-quantization scalar conversion formula:

$$qp=12.0+6.0*\log_2(q\text{scale}/0.85)$$

the preset quantization parameter 2 and the first quantization parameter 1, and the corresponding preset quantization scalar 0.27 and first quantization scalar 0.24 are determined respectively.

A coding curve function for the intra-frame coded frames is obtained by fitting historical data of actual coding parameters:

$$\text{estBits}I=f5*\text{bits}I*q\text{scale}/\text{est}Q$$

A predictive coding overhead $8.29\times10^{18}$ of the intra-frame coded frames of the source video is determined.

The obtained first quantization coefficient is limited by a predetermined threshold condition.

An appropriate threshold condition $1.3\times10^6$ or $1.6\times10^6$ is selected according to information such as usage requirements and characteristics of the source video. After the first quantization coefficient is determined, the first quantization coefficient determined in the above step is determined to be between th1 and th2, and the first quantization coefficient determined in the above step is used as the first quantization coefficient 1505330.

In the obtained sample coding overhead of the source video, $d_0$ and $d_1$ in a linear relationship of a to-be-coded proportion coefficient determined based on historical data are respectively 1 and 2, and the number of bits consumed for intra-frame coding of the current frame and the number of bits consumed for inter-frame coding of subsequent frames are substituted into the linear relationship of the to-be-coded proportion coefficient determined based on historical data:

$$f4=1*\frac{\text{bits}I}{\text{bits}PB}+2$$

bitsI is the number 500 of bits consumed for intra-frame coding of the current frame, bitsPB is the number 700000 of bits consumed for inter-frame coding of subsequent frames, and the determined to-be-coded proportion coefficient is 0.0007.

According to the to-be-coded proportion coefficient obtained in the above step, the preset quantization parameter corresponding to the pre-coding mode, boundary values t1=0.3, t2=0.5, and t3=1 of a quantization parameter threshold range corresponding to the conversion relationship between coding proportion coefficients and limit proportion coefficients determined based on historical data, $e_0=1200$, and $e_1=2$, the coding-limit proportion coefficient conversion relationship determined based on historical data is used:

$$f6=e_0*f4$$

A bit rate correction coefficient is determined to be 0.84.

Initial transmission bit rate limit information is acquired, and transmission bit rate limit information $8.4\times10^{20}$ is determined according to the bit rate limit correction coefficient and the initial transmission bit rate limit information $1\times10^{21}$.

After the transmission bit rate limit information is obtained, a bit value corresponding to the predictive coding overhead is compared with a bit value allowed to pass in the transmission bit rate limit information to determine that the bit value corresponding to the predictive coding overhead is smaller than the bit value allowed to pass, and the intra-frame coded frames in the frames to be coded are coded by using the first quantization parameter corresponding to the predictive coding overhead.

Second, a second quantization parameter used for coding the forward coded frames is determined.

A coded proportion coefficient 0.4 determined according to the number of coded frames and the number of frames to be coded in the source video is obtained according to the sampled video sequence, and the coded proportion coefficient satisfies a preset threshold condition 0.5.

An average value $6 \times 10^{20}$ calculated after accumulation of products of the number of bits consumed by respective coded frames in the sample coding overhead and the quantization scalar corresponding to the used coding mode is divided by an average value $8 \times 10^{20}$ of the number of bits consumed to code respective frames coded by the preset coding mode in the sample coding overhead to determine an original coding-pre-coding conversion coefficient that is equal to 0.75.

The bit value $1 \times 10^{21}$ allowed to pass in the transmission bit rate limit information is obtained, and the product $6.75 \times 10^{20}$ of the number $9 \times 10^{20}$ of bits consumed for pre-coding in the sample coding overhead and the original coding-pre-coding conversion coefficient 0.75 is divided by the bit value $1 \times 10^{21}$ allowed to pass to determine that the second quantization parameter corresponding to a second predictive coding overhead using a coding mode to be used is 0.675.

The corresponding second quantization parameter is determined according to the second predictive coding overhead obtained in the above step, and according to a characteristic parameter curve:

$$\text{weight} = f8 \frac{bitsI}{bitsPB} + f9 * intraRatio + f10$$

Where, weight represents a weighting proportion coefficient, bitsI is the number $5 \times 10^8$ of bits consumed for intra-frame coding, bitsPB is the number $1 \times 10^9$ of bits consumed for inter-frame pre-coding, intraRatio is a ratio 0.3 of intra-frame blocks, characteristic constants f8, f9, and f10 determined based on historical data are respectively 0.2, 0.1, and 0.2, the determined weighting proportion coefficient is 0.33, the second quantization parameter is determined to be 0.538 (0.67*0.67+0.33*0.27) according to the determined weighting proportion coefficient, and the second quantization parameter determined in the above step is updated.

The forward predictive coded frames in the frames to be coded are coded according to the updated second quantization parameter.

Finally, a third quantization parameter used to code the bidirectional differential coded frames is determined, adjacent frames are determined to be intra-frame coded frames, the first quantization parameter 0.24 is used as the third quantization parameter, and the bidirectional differential coded frames in the frames to be coded are coded by using the third quantization parameter 0.24.

It may be seen from this application scenario that, according to the method for coding a video in the present disclosure, a sampled video frame sequence of a source video is coded by using a preset coding mode to obtain a sample coding overhead; frame types of frames to be coded in the source video are analyzed to obtain a frame type sequence of the frames to be coded; a predictive coding overhead of the source video is determined according to the sample coding overhead of the source video, the frame type sequence of the frames to be coded, and quantization parameters of coding modes to be used corresponding to different frame types; and a coding strategy is determined based on the predictive coding overhead and the requirements of transmission bit rate limit information, so that bit rate allocation is performed in a more reasonable manner to improve the quality of video coding.

Figure 6:
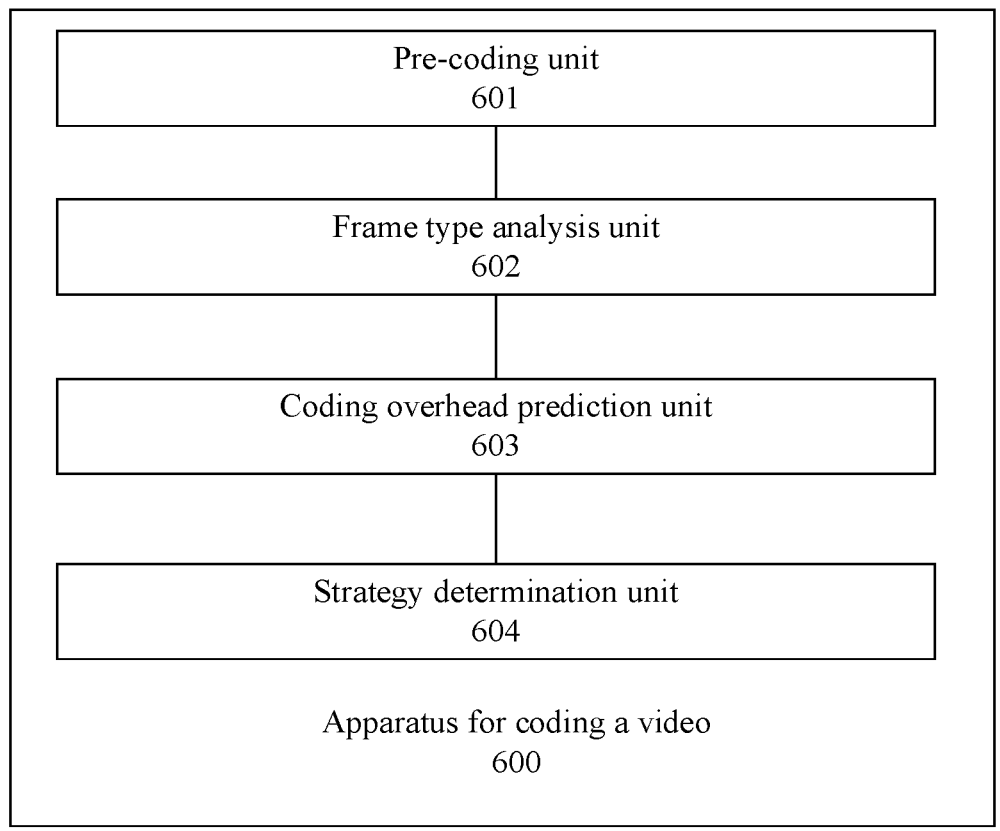
FIG. 6 is a schematic structural diagram of an embodiment of an apparatus for coding a video according to the present disclosure.

As shown in FIG. 6, an apparatus 600 for coding a video in this embodiment may comprise: a pre-coding unit 601, configured to code a sampled video frame sequence of a source video by using a preset coding mode to obtain a sample coding overhead; a frame type analysis unit 602, configured to analyze frame types of frames to be coded in the source video to obtain a frame type sequence of the frames to be coded; a coding overhead prediction unit 603, configured to determine a predictive coding overhead of the source video according to the sample coding overhead of the source video, the frame type sequence of the frames to be coded, and quantization parameters of coding modes to be used corresponding to different frame types; and a strategy determination unit 604, configured to determine a coding strategy based on the predictive coding overhead and the requirements of transmission bit rate limit information.

In some optional implementation modes of this embodiment, the coding overhead prediction unit 603 determining a predictive coding overhead of the source video according to the sample coding overhead of the source video, the frame type sequence of the frames to be coded, and quantization parameters of coding modes to be used corresponding to different frame types comprises: in response to determining that the frame types of the frames to be coded are intra-frame coded frame type, obtaining a first quantization parameter corresponding to a coding mode to be used corresponding to the intra-frame coded frame type, and calculating, according to a preset quantization parameter corresponding to the preset coding mode and a quantization scalar corresponding to the first quantization parameter, a preset quantization scalar corresponding to the preset quantization parameter and a first quantization scalar corresponding to the first quantization parameter respectively by using a quantization parameter-quantization scalar conversion formula; and according to a coding curve function for the intra-frame coded frames and the following first predictive coding parameters: the sample coding overhead, the preset quantization scalar corresponding to the preset quantization parameter, the first quantization scalar corresponding to the first quantization parameter, and a first quantization coefficient, determining the predictive coding overhead of the intra-frame coded frames of the source video; wherein the coding curve function for the intra-frame coded frames is obtained by fitting historical data of actual coding parameters.

In some optional implementation modes of this embodiment, the step of determining the first quantization coefficient in the coding overhead prediction unit 603 comprises: determining a predictive coding quantization parameter conversion coefficient according to the sample coding overhead and linear relationships of quantization parameter conversion coefficients determined based on historical data statistics; obtaining the first quantization parameter corresponding to the first coding mode to be used, and determining the first quantization coefficient according to the predictive coding quantization parameter conversion coefficient and the first quantization parameter by using the first quantization parameter-coefficient linear relationship determined based on historical data.

In some optional implementation modes of this embodiment, the determining the first quantization coefficient according to the predictive coding quantization parameter conversion coefficient and the first quantization parameter comprises: confining the obtained first quantization coefficient by a predetermined threshold condition.

In some optional implementation modes of this embodiment, the strategy determination unit 604 determining a coding strategy based on the predictive coding overhead of the source video and the requirements of transmission bit rate limit information comprises: in response to the predictive coding overhead of the intra-frame coded frames of the source video meeting the requirements of the transmission bit rate limit information, coding the intra-frame coded frames in the frames to be coded by using the first quantization parameter.

In some optional implementation modes of this embodiment, the strategy determination unit 604 determining a coding strategy based on the predictive coding overhead of the source video and the requirements of transmission bit rate limit information comprises: in response to the predictive coding overhead of the intra-frame coded frames of the source video not meeting the requirements of the transmission bit rate limit information, re-determining the first quantization parameter according to the predictive coding overhead of the intra-frame coded frames of the source video and the transmission bit rate limit information.

In some optional implementation modes of this embodiment, the transmission bit rate limit information in the strategy determination unit 604 is determined based on the following steps: determining a to-be-coded proportion coefficient of the source video according to the sample coding overhead; determining a bit rate limit correction coefficient according to the sample coding overhead, the to-be-coded proportion coefficient, and the first quantization parameter; acquiring initial transmission bit rate limit information; and determining the transmission bit rate limit information according to the bit rate limit correction coefficient and the initial transmission bit rate limit information.

In some optional implementation modes of this embodiment, the coding overhead prediction unit 603 determining a predictive coding overhead of the source video according to the sample coding overhead of the source video, the frame type sequence of the frames to be coded, and quantization parameters of coding modes to be used corresponding to different frame types comprises: in response to determining that the frame types of the frames to be coded are forward predictive coded frames, obtaining the transmission bit rate limit information and the preset coding quantization scalar corresponding to the preset coding mode respectively; and according to a coding curve function for the forward predictive coded frames and the following second predictive coding parameters: the transmission bit rate limit information, the sample coding overhead, and the preset quantization scalar, determining the predictive coding overhead of the forward predictive coded frames of the source video, wherein the coding curve function for the forward predictive coded frames is obtained by fitting historical data of actual coding parameters. The strategy determination unit determining a coding strategy based on the predictive coding overhead of the source video and the requirements of transmission bit rate limit information comprises: according to a characteristic proportion parameter of the source video and the following parameters: the preset quantization scalar corresponding to the preset coding mode and a second quantization parameter determined according to the predictive coding overhead of the forward predictive coded frames, performing weighting calculation to determine an updated second quantization parameter, wherein the characteristic proportion parameter is determined according to a characteristic parameter curve function and the sample coding overhead; and coding, based on the updated second quantization parameter, the forward predictive coded frames in the frames to be coded.

In some optional implementation modes of this embodiment, the strategy determination unit 604 coding, based on the second quantization parameter, the forward predictive coded frames in the frames to be coded comprises: determining a coded proportion coefficient according to the number of coded frames and the number of frames to be coded in the sampled video sequence, and determining whether the coded proportion coefficient satisfies a preset threshold condition; in response to determining that the coded proportion coefficient does not satisfy the preset threshold condition, adjusting the second quantization parameter according to the first quantization parameter; and coding the forward predictive coded frames in the frames to be coded by using the adjusted second quantization parameter.

In some optional implementation modes of this embodiment, the strategy determination unit 604 coding, based on the second quantization parameter, the forward predictive coded frames in the frames to be coded comprises: in response to determining that the coded proportion coefficient satisfies the preset threshold condition, coding the forward predictive coded frames in the frames to be coded by using the second quantization parameter.

In some optional implementation modes of this embodiment, the strategy determination unit 604 is further configured to, in response to determining that the frame types of the frames to be coded are bidirectional differential coded frames, determine a third quantization parameter according to a quantization parameter for adjacent frames, wherein the quantization parameter for the adjacent frames comprises: the first quantization parameter corresponding to the intra-frame coded frames and/or the second quantization parameter corresponding to the forward predictive coded frames; and code the bidirectional differential coded frames in the frames to be coded by using the third quantization parameter.

According to the embodiments of the present disclosure, the present disclosure further provides an electronic device and a readable storage medium.

Figure 7:
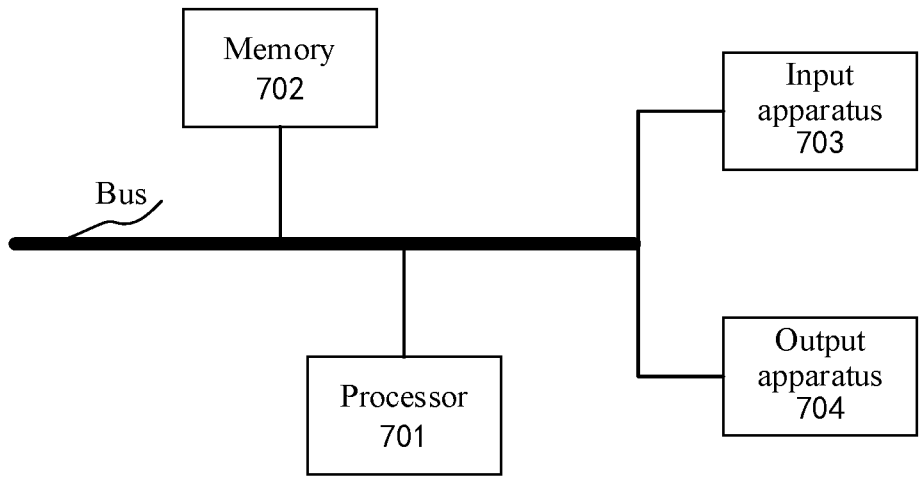
FIG. 7 is a block diagram of an electronic device suitable for implementing video coding according to an embodiment of the present disclosure.

As shown in FIG. 7, which is a block diagram of an electronic device of a method for coding a video according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processing, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 7, the electronic device includes: one or more processors 701, a memory 702, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a set of blade servers, or a multi-processor system). In FIG. 7, one processor 701 is used as an example.

The memory 702 is a non-transitory computer readable storage medium provided by the present disclosure. The memory stores instructions executable by at least one processor, so that the at least one processor performs the method for coding a video provided by the present disclosure. The non-transitory computer readable storage medium of the present disclosure stores computer instructions for causing a computer to perform the method for coding a video provided by the present disclosure.

The memory 702, as a non-transitory computer readable storage medium, may be used to store non-transitory software programs, non-transitory computer executable programs and modules, such as program instructions/modules corresponding to the method for coding a video in the embodiments of the present disclosure (for example, the pre-coding unit 601, the frame type analysis unit 602, coding overhead prediction unit 603, and the strategy determination unit 604 shown in FIG. 6). The processor 701 executes the non-transitory software programs, instructions, and modules stored in the memory 702 to execute various functional applications and data processing of the server, that is, to implement the method for coding a video in the foregoing method embodiment.

The memory 702 may include a storage program area and a storage data area, where the storage program area may store an operating system and at least one function required application program; and the storage data area may store data created by the use of the electronic device according to the method for coding a video, etc. In addition, the memory 702 may include a high-speed random access memory, and may also include a non-transitory memory, such as at least one magnetic disk storage device, a flash memory device, or other non-transitory solid-state storage devices. In some embodiments, the memory 702 may optionally include memories remotely provided with respect to the processor 701, and these remote memories may be connected to the electronic device of the method for coding a video through a network. Examples of the above network include but are not limited to the Internet, intranet, local area network, mobile communication network, and combinations thereof.

The electronic device of the method for coding a video may further include: an input apparatus 703 and an output apparatus 704. The processor 701, the memory 702, the input apparatus 703, and the output apparatus 704 may be connected through a bus or in other methods. In FIG. 7, connection through a bus is used as an example.

The input apparatus 703 may receive input digital or character information, and generate key signal inputs related to user settings and function control of the electronic device of the method for coding a video, such as touch screen, keypad, mouse, trackpad, touchpad, pointing stick, one or more mouse buttons, trackball, joystick and other input apparatuses. The output apparatus 704 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that may be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), and the Internet.

The computer system may include a client and a server. The client and the server are generally far from each other and usually interact through the communication network. The relationship between the client and the server is generated by computer programs that run on the corresponding computer and have a client-server relationship with each other.

According to the technical solution of the embodiment of the present disclosure, a sampled video frame sequence of a source video is coded by using a preset coding mode to obtain a sample coding overhead; frame types of frames to be coded in the source video are analyzed to obtain a frame type sequence of the frames to be coded; a predictive coding overhead of the source video is determined according to the sample coding overhead of the source video, the frame type sequence of the frames to be coded, and quantization parameters of coding modes to be used corresponding to different frame types; and a coding strategy is determined based on the predictive coding overhead and the requirements of transmission bit rate limit information, so that bit rate allocation is performed in a more reasonable manner to improve the quality of video coding.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure may be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for coding a video, comprising:
    coding a sampled video frame sequence of a source video by using a preset coding mode to obtain a sample coding overhead;
    analyzing frame types of frames to be coded in the source video to obtain a frame type sequence of the frames to be coded;
    obtaining a first quantization parameter corresponding to a coding mode to be used corresponding to an intra-frame coded frame type, in response to determining that the frame types of the frames to be coded are intra-frame coded frame type, and calculating a preset quantization scalar corresponding to a preset quantization parameter and a first quantization scalar corresponding to the first quantization parameter respectively by using a quantization parameter-quantization scalar conversion formula, according to a preset quantization parameter corresponding to the preset coding mode and a quantization scalar corresponding to the first quantization parameter; and
    determining a predictive coding overhead of intra-frame coded frames of the source video according to a coding curve function for the intra-frame coded frames and following first predictive coding parameters: the sample coding overhead, the preset quantization scalar corresponding to the preset quantization parameter, the first quantization scalar corresponding to the first quantization parameter, and a first quantization coefficient;
    wherein the coding curve function for the intra-frame coded frames is obtained by fitting historical data of actual coding parameters; and
    determining a coding strategy based on the predictive coding overhead and requirements of transmission bit rate limit information.

2. The method according to claim 1, wherein the first quantization coefficient is determined based on the following steps:
    determining a predictive coding quantization parameter conversion coefficient according to the sample coding overhead and linear relationships of quantization parameter conversion coefficients determined based on historical data statistics; and
    obtaining the first quantization parameter corresponding to a first coding mode to be used, and determining the first quantization coefficient according to the predictive coding quantization parameter conversion coefficient and the first quantization parameter by using a first quantization parameter-coefficient linear relationship determined based on historical data.

3. The method according to claim 2, wherein the determining the first quantization coefficient according to the predictive coding quantization parameter conversion coefficient and the first quantization parameter comprises:
    confining the obtained first quantization coefficient by a predetermined threshold condition.

4. The method according to claim 1, wherein the determining a coding strategy comprises:
    coding the intra-frame coded frames in the frames to be coded by using the first quantization parameter, in response to the predictive coding overhead of the intra-frame coded frames of the source video meeting the requirements of the transmission bit rate limit information.

5. The method according to claim 1, wherein the determining a coding strategy comprises:
    re-determining the first quantization parameter according to the predictive coding overhead of the intra-frame coded frames of the source video and the transmission bit rate limit information, in response to the predictive coding overhead of the intra-frame coded frames of the source video not meeting the requirements of the transmission bit rate limit information.

6. The method according to claim 1, wherein the transmission bit rate limit information is determined based on the following steps:
    determining a to-be-coded proportion coefficient of the source video according to the sample coding overhead;
    determining a bit rate limit correction coefficient according to the sample coding overhead, the to-be-coded proportion coefficient, and the first quantization parameter;
    acquiring initial transmission bit rate limit information; and
    determining the transmission bit rate limit information according to the bit rate limit correction coefficient and the initial transmission bit rate limit information.

7. The method according to claim 1, wherein the determining a predictive coding overhead of the source video comprises:
    obtaining the transmission bit rate limit information and a preset coding quantization scalar corresponding to the preset coding mode respectively, in response to determining that the frame types of the frames to be coded are forward predictive coded frames; and determining the predictive coding overhead of the forward predictive coded frames of the source video according to a coding curve function for the forward predictive coded frames and following second predictive coding parameters: the transmission bit rate limit information, the sample coding overhead, and the preset quantization scalar, wherein the coding curve function for the forward predictive coded frames is obtained by fitting historical data of actual coding parameters.

8. The method according to claim 7, wherein the determining a coding strategy comprises:
performing weighting calculation according to a characteristic proportion parameter of the source video and the following parameters: the preset quantization scalar corresponding to the preset coding mode and a second quantization parameter determined according to the predictive coding overhead of the forward predictive coded frames, to determine an updated second quantization parameter, wherein the characteristic proportion parameter is determined according to a characteristic parameter curve function and the sample coding overhead; and
coding, based on the updated second quantization parameter, the forward predictive coded frames in the frames to be coded.

9. The method according to claim 8, wherein the coding the forward predictive coded frames in the frames to be coded comprises:
determining a coded proportion coefficient according to a number of coded frames and a number of frames to be coded in the sampled video sequence, and determining whether the coded proportion coefficient satisfies a preset threshold condition;
adjusting the second quantization parameter according to the first quantization parameter, in response to determining that the coded proportion coefficient does not satisfy the preset threshold condition; and
coding the forward predictive coded frames in the frames to be coded by using the adjusted second quantization parameter.

10. The method according to claim 9, wherein the coding the forward predictive coded frames in the frames to be coded comprises:
coding the forward predictive coded frames in the frames to be coded by using the second quantization parameter, in response to determining that the coded proportion coefficient satisfies the preset threshold condition.

11. The method according to claim 8, further comprising:
determining a third quantization parameter according to a quantization parameter for adjacent frames, in response to determining that the frame types of the frames to be coded are bidirectional differential coded frames, wherein the quantization parameter for the adjacent frames comprises: the first quantization parameter corresponding to the intra-frame coded frames and/or the second quantization parameter corresponding to the forward predictive coded frames; and
coding the bidirectional differential coded frames in the frames to be coded by using the third quantization parameter.

12. An electronic device, comprising:
at least one processor; and
a memory communicatively connected to the at least one processor; wherein the memory stores instructions executable by the at least one processor, and the instructions, when executed by the at least one processor, causes the at least one processor to perform an operation for coding a video, comprising:
coding a sampled video frame sequence of a source video by using a preset coding mode to obtain a sample coding overhead;
analyzing frame types of frames to be coded in the source video to obtain a frame type sequence of the frames to be coded;
obtaining a first quantization parameter corresponding to a coding mode to be used corresponding to an intra-frame coded frame type, in response to determining that the frame types of the frames to be coded are intra-frame coded frame type, and calculating a preset quantization scalar corresponding to a preset quantization parameter and a first quantization scalar corresponding to the first quantization parameter respectively by using a quantization parameter-quantization scalar conversion formula, according to a preset quantization parameter corresponding to the preset coding mode and a quantization scalar corresponding to the first quantization parameter; and
determining a predictive coding overhead of intra-frame coded frames of the source video according to a coding curve function for the intra-frame coded frames and following first predictive coding parameters: the sample coding overhead, the preset quantization scalar corresponding to the preset quantization parameter, the first quantization scalar corresponding to the first quantization parameter, and a first quantization coefficient wherein the coding curve function for the intra-frame coded frames is obtained by fitting historical data of actual coding parameters; and
determining a coding strategy based on the predictive coding overhead and requirements of transmission bit rate limit information.

13. A non-transient computer-readable storage medium storing computer instructions, wherein the computer instructions are used for a computer to perform an operation for coding a video, comprising:
coding a sampled video frame sequence of a source video by using a preset coding mode to obtain a sample coding overhead;
analyzing frame types of frames to be coded in the source video to obtain a frame type sequence of the frames to be coded;
obtaining a first quantization parameter corresponding to a coding mode to be used corresponding to an intra-frame coded frame type, in response to determining that the frame types of the frames to be coded are intra-frame coded frame type, and calculating a preset quantization scalar corresponding to a preset quantization parameter and a first quantization scalar corresponding to the first quantization parameter respectively by using a quantization parameter-quantization scalar conversion formula, according to a preset quantization parameter corresponding to the preset coding mode and a quantization scalar corresponding to the first quantization parameter; and
determining a predictive coding overhead of intra-frame coded frames of the source video according to a coding curve function for the intra-frame coded frames and following first predictive coding parameters: the sample coding overhead, the preset quantization scalar corresponding to the preset quantization parameter, the first quantization scalar corresponding to the first quantization parameter, and a first quantization coefficient wherein the coding curve function for the intra-frame coded frames is obtained by fitting historical data of actual coding parameters; and determining a coding strategy based on the predictive coding overhead and requirements of transmission bit rate limit information.

14. The medium according to claim 13, wherein the first quantization coefficient is determined based on the following steps:

determining a predictive coding quantization parameter conversion coefficient according to the sample coding overhead and linear relationships of quantization parameter conversion coefficients determined based on historical data statistics; and obtaining the first quantization parameter corresponding to a first coding mode to be used, and determining the first quantization coefficient according to the predictive coding quantization parameter conversion coefficient and the first quantization parameter by using a first quantization parameter-coefficient linear relationship determined based on historical data.

15. The medium according to claim 14, wherein the determining the first quantization coefficient according to the predictive coding quantization parameter conversion coefficient and the first quantization parameter comprises:

confining the obtained first quantization coefficient by a predetermined threshold condition.

16. The medium according to claim 13, wherein the determining a coding strategy comprises:

coding the intra-frame coded frames in the frames to be coded by using the first quantization parameter, in response to the predictive coding overhead of the intra-frame coded frames of the source video meeting the requirements of the transmission bit rate limit information.

17. The medium according to claim 13, wherein the determining a coding strategy comprises:

re-determining the first quantization parameter according to the predictive coding overhead of the intra-frame coded frames of the source video and the transmission bit rate limit information, in response to the predictive coding overhead of the intra-frame coded frames of the source video not meeting the requirements of the transmission bit rate limit information.

18. The medium according to claim 13, wherein the transmission bit rate limit information is determined based on the following steps:

determining a to-be-coded proportion coefficient of the source video according to the sample coding overhead;

determining a bit rate limit correction coefficient according to the sample coding overhead, the to-be-coded proportion coefficient, and the first quantization parameter;

acquiring initial transmission bit rate limit information; and determining the transmission bit rate limit information according to the bit rate limit correction coefficient and the initial transmission bit rate limit information.

* * * * *